(No Model.)
E. DANNENBERG.
TOBACCO PIPE.
No. 473,212. Patented Apr. 19, 1892.
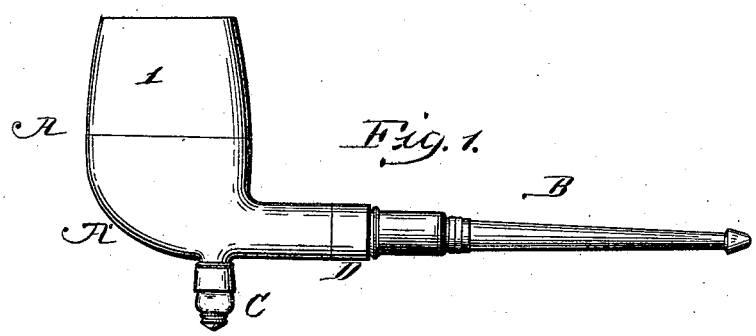
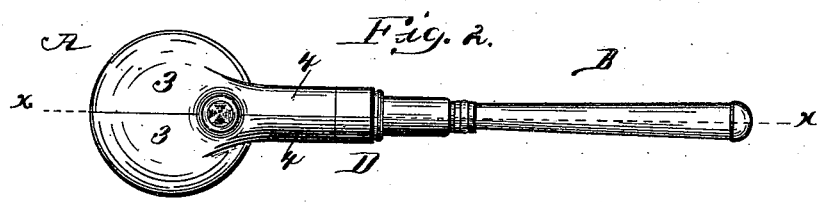
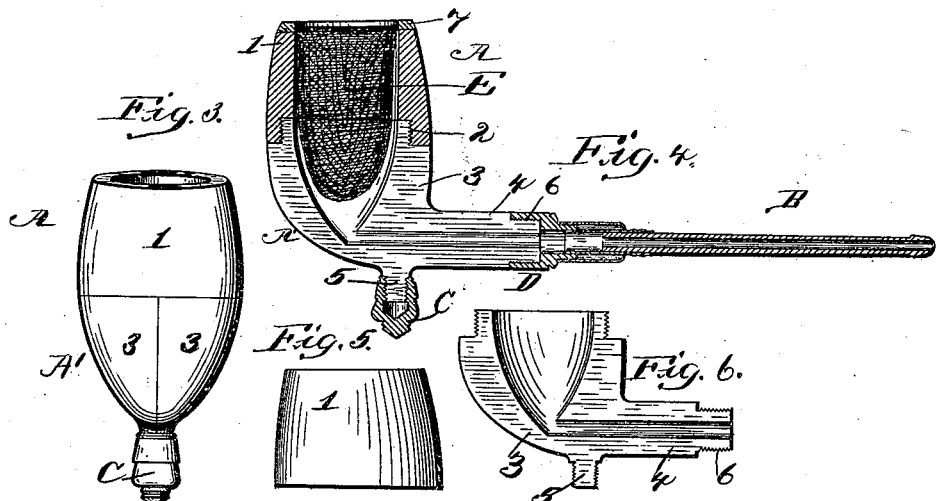
Witnesses
W. D. Middleton
M. M. Wagner
Inventor
Edward Dannenberg
By Chas. G. Page
Atty.

UNITED STATES PATENT OFFICE.

EDWARD DANNENBERG, OF CHICAGO, ILLINOIS.

TOBACCO-PIPE.

SPECIFICATION forming part of Letters Patent No. 473,212, dated April 19, 1892.

Application filed November 10, 1891. Serial No. 411,490. (No model.)

*To all whom it may concern:*

Be it known that I, EDWARD DANNENBERG, a subject of the Emperor of Russia, residing at Chicago, in the county of Cook and State of Illinois, have invented a certain new and useful Improvement in Tobacco - Pipes, of which the following is a specification.

The objects of my invention are to provide a construction of sectional tobacco-pipe which can be readily taken apart, so as to admit it to be cleaned, and which, when put together, can be securely held along the joints or lines of division, so as to prevent leakage or ingress of air at improper points.

A further object is to provide a tobacco-pipe with means for separating the tobacco from the wall of the pipe, and thereby prevent the pipe from becoming charred, and thus render it more agreeable to the user and keep the tobacco dry and free from contact with any deposit of nicotine in the bowl.

In the accompanying drawings, Figure 1 represents in side elevation a tobacco-pipe embodying my invention. Fig. 2 is a bottom plan view of the same. Fig. 3 may be said to represent the bowl in front elevation. Fig. 4 is a longitudinal central section through the pipe. Fig. 5 represents the upper section of the bowl detached. Fig. 6 represents one of the removable halves or sections of the lower portion of the bowl. Fig. 7 represents the supplemental bowl or tobacco-holder removed. Fig. 8 represents a threaded sleeve detached.

The bowl A and the stem B can be made detachable from one another in any suitable way, and the bowl is divided horizontally into an upper bowl portion 1 and a lower bowl portion A'. The upper portion 1 of the bowl is made separate from the lower portion of the bowl and connected with the same by a screw-joint 2, which may consist, for example, of a threaded neck on the lower bowl portion, arranged to screw into a threaded socket in the upper bowl portion, or conversely. The upper bowl portion may have a threaded neck arranged to screw into a threaded socket in the lower bowl portion. The lower bowl portion A' is divided vertically and longitudinally into the two halves 3 and 3, whereof each also comprises a certain length of stem portion 4, as best illustrated in Figs. 4 and 6. When the halves of the lower bowl portion are fitted together, they can be screwed as one piece into the upper bowl portion 1. Each half of the lower bowl portion also comprises one-half 5 of an externally-threaded lug, so that when the two halves of the lower bowl portion are fitted together an ornamental cap C can be screwed onto said lug, so as to assist in clamping and holding the two halves of the lower bowl portion together. The divided stem portion is also threaded at its end, as at 6, to receive a threaded socket D, which can be screwed thereon, so as to firmly hold together the divisions 4 4 of said stem portion and also provide means whereby the stem B can be detachably connected with the bowl. By unscrewing the socket D and cap C and either prior or subsequently thereto unscrewing the lower bowl portion from the upper bowl portion the lower bowl portion can be taken apart and cleaned.

E indicates a foraminous basket or holder, which can be held within the bowl, so as to receive the tobacco and thereby provide in effect a lining or false wall or bottom, which will prevent the burning tobacco from coming in direct contact with the inner wall of the bowl proper and also keep it clean from any deposit of nicotine in the bowl. The basket or tobacco-holder E can be made of wire-gauze or perforated metal or of any other suitable perforated material, and is provided along its upper edge with an annular flange 7, adapted to fit upon the top edge of the bowl, so as to steady the holder.

With further reference to the screw-socket arranged to screw onto the divided stem portion of the bowl, it is understood that said socket can be made separate from or integral with the stem proper.

By my invention I am enabled to provide a neat and desirable bowl, which does not require the presence of a metal cap-ring at its top, it being well-known that few smokers will purchase brier-wood pipes having metal cap-rings. I also avoid splitting the entire bowl, and thereby provide a more desirable article. I also apply the stem proper to the screw-socket in place of fitting it directly in the divided stem portion of the bowl, it being seen that the stem can be either screwed into or made in one piece with the said socket.

What I claim as my invention is—

1. A sectional tobacco-pipe having the bowl divided horizontally into the upper bowl portion 1 and the lower bowl portion A', the lower bowl portion being divided vertically and longitudinally and the said two bowl portions being provided with a screw-threaded connection, so that when the two halves of the lower bowl portion are fitted together the two bowl portions can be coupled together, substantially as and for the purpose described.

2. In a sectional tobacco-pipe, the bowl divided horizontally, so as to provide the upper bowl portion 1 and the lower bowl portion A', the two bowl portions being provided with a screw-threaded connection and the lower bowl portion being provided with a lug and a stem portion and divided vertically and longitudinally, so as to provide a couple of sections 3, each having a section 5 of said lug and a section 4 of said stem portion, combined with a sleeve 6, secured upon the divided stem portion, and a cap C, secured upon the divided lug, substantially as and for the purpose described.

EDWARD DANNENBERG.

Witnesses:
CHAS. G. PAGE,
W. D. MIDDLETON.